United States Patent Office 2,773,034
Patented Dec. 4, 1956

2,773,034

TREATMENT OF LUBRICANTS WITH POTASSIUM HYDROXIDE AND PRODUCTS

John D. Bartleson, Beachwood Village, Ohio, assignor to The Standard Oil Company, Cleveland, Ohio, a corporation of Ohio No Drawing. Application February 17, 1953, Serial No. 337,446

16 Claims. (Cl. 252—32.7)

This invention relates to a method of improving the characteristics of phosphorus sulfide-oxygen-containing organic compound-olefin polymer reaction products, especially phosphorus sulfide-ester wax-olefin polymer reaction products, and more particularly to a process for treating such reaction products with solid potassium hydroxide and to the improved products thereby obtained.

In U. S. Patent No. 2,566,241, dated August 28, 1951, there are described the reaction products of oxygen-containing organic compounds of high molecular weight with an olefin polymer and phosphorus sulfide. These lubricant additives are suitable for use under various conditions including high temperatures or high pressure, or both. Under certain circumstances, however, these lubricating additives in use may display a tendency to darken and may also liberate hydrogen sulfide, which may render the lubricant composition offensive to the consumer although not affecting the lubricant's engine performance characteristics.

In accordance with the instant invention, the lubricants and lubricant additives described in Patent No. 2,566,241 are caused to react with solid potassium hydroxide in an amount in excess of that which leads to an increase in the ash content of the additive, usually in excess of one equivalent of potassium hydroxide per mole of the additive. The product obtained as a result of this process has improved properties, particularly improved color and color stability and stability against liberation of hydrogen sulfide, and better engine performance characteristics.

The potassium hydroxide employed in the process of the invention should be in the solid form and preferably is substantially anhydrous. It is possible, however, to employ with advantage the commercial forms, such as solid flake potassium hydroxide, containing up to approximately 20% water.

The reaction is effected without the addition of supplemental water. Aqueous potassium hydroxide solutions tend deleteriously to affect the corrosion inhibition properties of the treated additive, some additives so treated failing to meet accepted standards for corrosion inhibition, and also detract from the antioxidant properties of the additive, demonstrated by the poor used oil analyses of lubricants containing the additives treated therewith. In contrast, additives treated with solid potassium hydroxide in accordance with the invention are better in these characteristics than the untreated additive.

In this respect, the invention is to be distinguished from the process of treating phosphorus sulfide-organic compound reaction products with aqueous potassium hydroxide alone or with other ingredients. The presence of water in excess of the amount of 20% occluded in the solid potassium hydroxide used in the instant process is definitely undesirable and disadvantageously affects the properties of the finished additives.

Any amount of potassium hydroxide that is in excess of the amount which increases the ash content of the additive will improve the product. It may be noted that the reaction of the acidic initial phosphorus sulfide oxygen-containing organic compound olefin polymer reaction products with metal bases, such as potassium hydroxide, first produces the corresponding metal derivatives. These salts are detergent type additives and the metal of the base enters the molecule of the additive, where its presence is confirmed by the increase in the ash content of the additive.

In accordance with the invention it has been ascertained that an amount of potassium hydroxide in excess of that resulting in an increase in the ash content of phosphorus sulfide-oxygen-containing organic compound olefin polymer reaction products will lead to a further improvement in the properties of the lubricating oil additive. Approximately one equivalent of potassium hydroxide will neutralize one mole of the acidic phosphorus sulfide-oxygen-containing organic compound-olefin polymer reaction product described in U. S. Patent No. 2,566,241. In accordance with the invention, an amount of potassium hydroxide in excess of this is reacted with the said reaction product.

Although any amount of potassium hydroxide in excess of one equivalent of potassium hydroxide will effect a further improvement in properties, it is preferred to employ at least about 1.25 equivalents of potassium hydroxide. The amounts within the range from 1.25 to 2 equivalents show a considerable improvement in additive properties, particularly in color, color stability, stability against liberation of hydrogen sulfide, and engine performance characteristics. Amounts in excess of two equivalents are useful, but the improvement obtained begins to lessen when three or more equivalents of potassium hydroxide are reacted, and a new increase in ash content occurs, indicating that a different reaction is taking place. Accordingly, there is no reason to use more than approximately three equivalents of potassium hydroxide in the process of the invention, and this amount represents the usual upper limit of potassium hydroxide employed.

The reaction is conducted employing solid potassium hydroxide. The solid forms of potassium hydroxide available in commerce contain a small proportion of occluded water. Commercial flake potassium hydroxide, for example, contains approximately 12%–15% water. Such water in amounts up to approximately 20% does not have a deleterious effect upon the reaction. It is important to note, however, that aqueous solutions of potassium hydroxide cannot be employed. Evidently, the reaction takes a different course when the potassium hydroxide is in solution in water. It is not understood why water of solution and water occluded in solid potassium hydroxide should have such a different effect. Perhaps the effect is due to a change in the potassium hydroxide, which would be ionized in solution.

The reaction is carried out at an elevated temperature, generally in excess of 150° F. and preferably at least part of the reaction is conducted at 250° F. or above. The upper limit is determined by the stability of the reaction product and is not critical. The reaction time is a function of the temperature, potassium hydroxide concentration, rate of mixing and like reaction conditions, and likewise cannot be definitely specified. At a reaction temperature of 180° to 250° F. a reaction time of two hours or more is indicated while at more elevated temperatures, say 300° F., one and one-half to one and three-quarters hours is more than ample.

The reaction leads to a loss in the sulfur content of the additive, but this does not detract from its engine performance characteristics. To counteract this, or to add sulfur, the reaction product can be reacted with sulfur or another element of the sulfur family, e. g., sulfur, selenium or tellurium, can be incorporated into the reaction product. This sulfur can be incorporated by adding elemental sulfur or a compound which yields sulfur, such as by treating the sulfide-derived reaction product therewith, or treating a derivative of the sulfur-derived reaction product therewith.

At the conclusion of the reaction, insoluble and precipitated materials are separated from the reaction mixture. This can be done by any conventional methods, including filtration, gravity settling, and centrifuging. The desired improved additive is recovered as the filtrate or centrifugate or is decanted, depending upon the process used. If desired, the final product can be distilled and extracted with a suitable solvent, e. g., liquid propane, isopropyl alcohol, acetone, and other solvents known in the art, to remove insolubles.

Inasmuch as the potassium hydroxide in excess of one equivalent which reacts with the reaction product does not enter the molecule of the additive, it is thought that it combines with other materials present and probably soluble in the starting material but rendered insoluble in the course of the reaction so that they are removed at the conclusion of the reaction by the separation techniques referred to. The nature of these materials is not fully understood. It is possible that the starting reaction product contains a certain proportion of phosphorus- or sulfur-containing acids which, if present in the lubricating oil, would be expected to have a deleterious effect, probably acting as catalyst for undesirable reactions. The potassium salts of these acids would be expected to be oil-insoluble salts, e. g., phosphates, sulfates, etc. and therefore would be recovered in the residue which is separated from the reaction mixture. This explanation is being checked by further research and is advanced here only as one possible explanation of the improved results obtained by the process of the invention.

The process is applicable to any of the phosphorus sulfide-oxygen-containing organic compound-olefin polymer reaction products described in U. S. Patent No. 2,566,241. Particularly advantageous results are obtained when the process is applied to phosphorus sulfide-ester wax olefin polymer reaction products. A large variety of ester waxes are reactive with phosphorus sulfides and are suitable, for example, degras, beeswax, sperm oil and hydrogenated sperm oil. Degras is a crude grease obtained by washing sheep's wool, and contains several components reactive with phosphorus sulfides. Degras itself and fractions derived therefrom and reactive with phosphorus sulfides can be used. Because of its versatility degras is a preferred ester wax. In general, aliphatic ester waxes having from 12 to generally not over 20 carbon atoms are employed, although compounds of up to 50 carbon atoms or more are suitable. Both straight and branched chains saturated and unsaturated aliphatic ester waxes can be used. Illustrative of some conveniently applicable ester waxes in addition to those referred to above are lanolin, cetyl stearate, ceryl cerotate, ceryl palmitate, myricyl palmitate, octadecyl palmitate, cetyl cerotate, ceryl stearate, cetyl palmitate, spermaceti, insect wax, carnauba wax, wool wax, and other waxes.

In the broader aspects of the invention, there may be used an oxygen-containing compound containing hydroxy, carbonyl, or ether oxygen, and desirably of rather high molecular weight, preferably having a boiling point of at least 225° F. The reaction may be conducted under pressure, if desired, in the case of lower boiling materials. There may be used esters, as alkyl or cycloparaffin or aryl esters of organic acids; fatty oils, higher alcohols, higher carboxylic acids, saturated and unsaturated, monobasic and dibasic, petroleum acids, naphthenic acid, rosin, modified rosin, glycol ethers, higher ketones and aldehydes; also halogenated derivatives of any of these. Illustrative of some conveniently applicable materials are: beeswax, sperm oil, other waxes, butyl stearate, ethyl lactate, methyl oleate, butyl ricinoleate, butyl phthalate, methyl stearate, methyl dichlorostearate, methyl chloronaphthenate, dichloro-palmitic acid, coconut oil, babassu oil, hydrogenated coconut and other vegetable oils, other fatty oils, ethylene glycol monoethers, diglycol chlorohydrin, lauryl alcohol, stearic acid, lauric acid, oleic acid, palmitic acid, myristic acid, naphthalic acid, naphthoic acid, benzoic acid, naphthenic acids, hydroxystearic acid, dihydroxybenzoic acid, hydroxynaphthenic acids, dihydroxystearic acid, chlorobenzoic acid, dichlorostearic acid, dichlorobenzoic acid, dichlorodihydroxystearic acid, lactones, palmitone, oxidized petroleum fatty acid or other petroleum product, as oxidized wax, kerosene, gas oil or other oxidized petroleum oil. The oxygenated compound used in forming the reaction product should be selected with reference to the use of the final composition and properties desired in it, e. g., to give a reaction product having oil solubility or dispersibility.

Any of the olefin polymers referred to in U. S. Patent No. 2,566,241 can be employed.

The polyolefin which may be used is one which improves the viscosity index of lubricating oil, e. g., one having a molecular weight of about 2,000 to 100,000 and which is soluble in lubricating oils. These materials are substantially saturated as the art will appreciate. As mentioned above, such materials are known in the art.

Paratone is preferred. This is a polyisobutylene of 10,000 to 20,000 molecular weight, in solution in an oil in an amount to give a viscosity of 3,000 SSU at 210° F.

Any phosphorus sulfide can be employed, phosphorus pentasulfide being preferred.

The following examples are illustrative:

In the examples that follow the additive's stability against liberation of hydrogen sulfide is determined as a 4% solution in an SAE No. 20 lubricating oil by heating the solution in a closed container at 150° F. for 16 hours. The $H_2S$ concentration in p. p. m. is determined by removing the hydrogen sulfide from the oil with the aid of nitrogen and passing the resulting gas mixture through ammoniacal zinc sulfate solution. The precipitated zinc sulfate is determined iodometrically. This is a severe test.

The color of the additive was determined as optical density in accordance with ASTM specification No. D155–45T.

*Example A*

Twenty parts by weight of $P_2S_5$ was mixed with a portion of 100 parts of a neutral diluent lubricating oil to form a slurry and this was mixed with 25 parts of degras (a high molecular weight ester mixture derived from wool fat) and 75 parts of Paratone (a polyisobutylene having a molecular weight of 10,000 to 20,000 in solution in an oil in an amount to give a viscosity of 3,000 SSU at 210° F.). The balance of the neutral diluent oil was added and the mixture reacted with agitation for one hour at 300° F., allowed to settle, decanted and filtered. The product analyzed 3.90% sulfur and 1.20% phosphorus (7.8% sulfur and 2.4% phosphorus excluding the neutral oil).

A portion of this additive was reserved for further testing. A portion was treated with clay to produce the additive of Example B, and the remainder was employed in the preparation of additives of the invention which follow.

*Example B*

A portion of Example A was treated with 4% by weight of clay in the conventional manner, in order to improve its color. The resulting material is referred to hereinafter as the additive of Example B.

*Examples 1 to 4*

One hundred part portions of the additive of Example A, as a 50% solution in a solvent-extracted neutral oil, 225 SSU at 100° F., were heated for one hour at 180° F. and one hour at 250° F. with flake potassium hydroxide containing about 15% water in the amounts indicated in the table below. The reaction mixture then was blown with air for an additional 30 minutes to remove water liberated in the course of the reaction. Filter aid (3%) was added and the mixture filtered to remove excess unreacted potassium hydroxide and insoluble residual material. The concentration of additive in the oil was adjusted to 50%, and this concentrate used in the tests which follow.

Each of the reaction products was subjected to the hydrogen sulfide stability test with the following results:

TABLE I

| Example No. | Equivs. of Solid KOH | $H_2S$ (p. p. m.) |
|---|---|---|
| 1 | 0.5 | 44 |
| 2 | 1.0 | 60 |
| 3 | 2.0 | 12 |
| 4 | 3.0 | 41 |

The stability of these additives against liberation of hydrogen sulfide would be regarded as good and meets commercial requirements.

The following table compares the color of Examples A and B with Example 3 (50% concentration in a solvent-extracted neutral oil, 225 SSU at 100° F.):

TABLE II

| Example No. | Clay | Equivs. of Solid KOH | Color (O. D.) of Additive |
|---|---|---|---|
| A | | | 598 |
| B | 4 | | 299 |
| 3 | | 2 | 257 |

Example 3 is much lighter in color than A, and better in color even than B, which was treated with clay.

Examples Nos. 2 and 3 were tested for engine performance characteristics, using the Chevrolet L-4 Engine Test, in a conventional acid-tested Mid-Continent lubricating oil base stock, (SAE 20 grade). The following results were obtained:

TABLE III

| | Example No. | |
|---|---|---|
| | 2 | 3 |
| Equivs. KOH Added | 1 | 2 |
| Sulfur | 0.13 | 0.13 |
| Conc. of additive in oil | 3.2 | 3.9 |
| Varnish rating | 43.50 | 47.00 |
| Piston skirt | 8.00 | 8.75 |
| Cylinder walls | 6.75 | 8.25 |
| Sludge rating | 46.75 | 46.75 |
| Overall rating | 90.25 | 93.75 |
| Cu-Pb corrosion (mgms.) | 85 | 73 |
| Viscosity Increase, SSU | 74 | 117 |
| Percent pentane insolubles | 1.62 | 2.11 |
| Percent benzene solubles | 1.24 | 1.70 |
| Neutralization Number | 1.0 | 1.1 |
| Demerit rating | 4.8 | 4.3 |

Examples 2 and 3 show that treatment with either one or two equivalents of potassium hydroxide gives satisfactory engine performance, although the additive treated with two equivalents of KOH is superior to the one with one equivalent of KOH.

*Examples 5 to 8*

Portions of the additive of Example B were treated with flake potassium hydroxide (15% water) as in Examples 1 to 4. The following table compares the color of these additives with that of Example B, at a 50% concentration in solution in a solvent-extracted neutral oil, 225 SSU at 100° F.

TABLE IV

| Example | Percent Clay | Equivs. of Dry KOH | Color (O.D.) of Additive |
|---|---|---|---|
| B | 4 | | 351 |
| 5 | 4 | 1.0 | 320 |
| 6 | 4 | 1.5 | 333 |

It is evident from the above results that the treatment of the invention improves the color of a clay treated additive.

Solutions of 4% additive (50% concentrate) in an SAE No. 20 motor oil were prepared of each of these additives and stored for one month at 150° F., after which the optical densities were again measured. The following results were obtained:

TABLE V

| Example No. | Color (O.D.) of Additive | O. D. Increase |
|---|---|---|
| B | 351 | 66 |
| 5 | 320 | 13 |
| 6 | 333 | 11 |

These results show that the additives which have been treated with potassium hydroxide have a greatly increased color stability on storage.

The additives were subjected to the hydrogen sulfide stability test with the following results:

TABLE VI

| Example No. | Equivs. of Solid KOH | $H_2S$ (p. p. m.) | |
|---|---|---|---|
| | | Before | After |
| 6 | 1.5 | 13 | 6 |
| 7 | 2.0 | 13 | 8 |

It is evident from the above results that the hydrogen sulfide stability is greatly improved by the treatment with potassium hydroxide.

The additives of Examples B and 8 were subjected to the Chevrolet Engine L-4 Test, in a conventional acid-treated Mid-Continent lubricating oil base stock (SAE 20 grade).

TABLE VII

| | Example No. | |
|---|---|---|
| | B | 8 |
| Percent clay | 4 | 4 |
| Equivalents KOH | | 2 |
| Added sulfur | 0.16 | 0.14 |
| Concentration of additive in oil | 4.72 | 4.72 |
| Varnish rating | 37.25 | 45.50 |
| Piston skirt | 4.50 | 8.50 |
| Cylinder walls | 3.50 | 8.00 |
| Sludge rating | 44.50 | 48.75 |
| Overall rating | 81.75 | 94.25 |
| Cu-Pb Corrosion (mgms.) | 94 | 139 |
| Viscosity Increase, SUS | 126 | 122 |
| Percent Pentane Insolubles | 1.87 | 1.87 |
| Percent Benzene Solubles | 1.14 | 1.02 |
| Neutralization Number | 1.4 | 1.4 |
| Demerit rating | 9 | 4.6 |

The demerit rating of the potassium hydroxide-treated additive is half that of the untreated additive. This improvement in engine performance is obtained even though the sulfur content of the additive is less. The improvement in varnish and sludge ratings is especially noteworthy.

*Examples 9 to 13*

Portions of the additive of Example B were treated with dry flake potassium hydroxide (15% water) as set forth in Examples 1 to 4 and the color of the additives at a 25% concentration in solution in a solvent extracted neutral oil, 225 SSU at 100° F., determined and compared with that of Example B.

TABLE VIII

| Example | Equivs. of Solid KOH | Color (O. D.) of Additive |
|---|---|---|
| B | | 250 |
| 9 | 0.74 | 238 |
| 10 | 0.83 | 223 |
| 11 | 1.00 | 193 |
| 12 | 1.25 | 198 |
| 13 | 1.50 | 175 |

The improvement in color obtained by the process of the invention is dependent upon the amount of potassium hydroxide used, and best results in this series of runs were obtained with 1.5 equivalents of solid potassium hydroxide.

*Examples 14 and 15*

Portions of the additive of Example A were treated with one and two equivalents, respectively, of dry flake potassium hydroxide ((15% water) as in Examples 1 to 4. These additives were subjected to the hydrogen sulfide stability test with the following results:

TABLE IX

| Example | Equivs. of Solid KOH | $H_2S$ (p. p. m.) Before | $H_2S$ (p. p. m.) After |
|---|---|---|---|
| 14 | 1.0 | 47 | 14 |
| 15 | 2.0 | 47 | 6 |

It is clear that the improvement in hydrgen sulfide stability is in proportion to the amount of potassium hydroxide used. The amount of hydrogen sulfide liberated from the product reacted with two equivalents of potassium hydroxide is less than half that liberated from the product reacted with one equivalent of potassium hydroxide.

The color of the product reacted with two equivalents of potassium hydroxide is compared in the table below with the additive of Example 3 after storage for one month at 150° F. in a 4% solution of SAE No. 20 motor oil:

TABLE X

| Example No. | Percent Clay | Equivs. of Dry KOH | O. D. Increase |
|---|---|---|---|
| Motor oil containing no additive | | | 14 |
| B | 4 | | 143 |
| 15 | | 2.0 | 8 |

The color stability of the additive of the invention is excellent compared with the clay-treated additive, Example B. The color stability is appreciably greater than the uninhibited motor oil. The results show that an oil solution containing the clay-treated additive is appreciably lower in color stability than the oil itself, whereas the oil solution containing the additive of the invention is more stable against increase in color than the oil itself.

The additive of Example 15 was subjected to the L-4 Chevrolet Engine Test at the concentration in the oil to give equal sulfur levels in each sample, in a conventional acid-treated Mid-Continent lubricating oil base stock (SAE 20 grade), in comparison with a parallel run of the additive of Example B.

TABLE XI

| | Example No. B | Example No. 15 |
|---|---|---|
| Percent clay | 4 | |
| Equivalents KOH | | 2 |
| Added sulfur | 0.16 | 0.13 |
| Concentration of additive in oil | 4.28 | 5.3 |
| Varnish rating | 41.75 | 47.25 |
| Piston skirt | 6.75 | 8.75 |
| Cylinder walls | 7.50 | 8.75 |
| Sludge rating | 44.00 | 48.75 |
| Overall rating | 85.75 | 96.00 |
| Cu-Pb Corrosion (mgms.) | 52 | 80 |
| Viscosity Increase, SUS | 112 | 116 |
| Percent Pentane Insolubles | 2.15 | 1.86 |
| Percent Benzene Solubles | 1.38 | 1.46 |
| Neutralization Number | 0.85 | 1.1 |
| Demerit rating | 6.4 | 3.7 |

The demerit rating of the oil containing the additive of the invention is approximately one-half that of the oil containing the additive of Example B, showing the improvement in engine performance due to the potassium hydroxide treatment.

*Examples 16 and 17*

In order to demonstrate that the improvement obtainable by treatment with dry flake potassium hydroxide is not obtained when aqueous potassium hydroxide is used, the following experiments were run. Additives were prepared in accordance with the procedure of Examples 1 to 4 using two equivalents of dry flake potassium hydroxide (15% water) and two equivalents of a 50% aqueous solution of potassium hydroxide, respectively. The additives thus obtained were subjected to the L-4 Chevrolet Engine Test in a conventional acid-treated Mid-Continent lubricating oil base stock (SAE 20 grade) with the following results:

TABLE XII

| | Example No. 16 | Example No. 17 |
|---|---|---|
| Equivalents KOH | 2 dry KOH | 2 aqueous KOH (50% water). |
| Added sulfur, percent | 0.13 | 0.13. |
| Conc. Additive, percent | 9.3 | 9.0. |
| Copper Naphthenate, percent | 0.05 | 0.1. |
| Overall Rating | 92.25 | 92.75. |
| Varnish Rating | 46.25 | 47.00. |
| Piston skirt | 8.75 | 8.75. |
| Rocker Arm Cover Plate | 9.75 | 10.00. |
| Push Rod Cover Plate | 10.00 | 10.00. |
| Cylinder Walls | 7.75 | 8.25. |
| Crankcase Oil Pan | 10.00 | 10.00. |
| Sludge Rating | 46.00 | 45.75. |
| Rocker Arm Assembly | 9.25 | 8.75. |
| Rocker Arm Cover Plate | 9.00 | 9.00. |
| Push Rod Cover Plate | 9.00 | 9.00. |
| Oil Screen | 10.00 | 10.00. |
| Crankcase Oil Pan | 8.75 | 9.00. |
| Cu-Pb Corrosion [1] | 121 mg | 218 mg. |
| Viscosity Increase, SUS | 102 | 128. |
| Percent Pentane Insolubles | 1.58 | 2.52. |
| Percent Benzene Solubles | 0.98 | 1.79. |
| Neutralization Number | 1.1 | 0.9. |
| Demerit Rating | 4.47 | 6.01. |

[1] Half shell, 175 mg. passing.

The additive prepared with the use of dry KOH is appreciably superior to the additive prepared using aqueous KOH in copper-lead corrosion and in used oil analyses. Example 17 fails to meet corrosion inhibition standards, having a value of 218 mg. loss whereas 175 mg. loss is the maximum. These improvements lead to an overall demerit rating 1.6 units less in the case of the additive of the invention.

The additive of Example 16 was subjected to the hydrogen sulfide stability test and liberated 18 p. p. m. $H_2S$ in this test compared with 45 p. p. m. $H_2S$ for the untreated additive of Example A.

Examples 18 to 27

The potassium hydroxide employed in the process of the invention does not merely neutralize the acidity of the phosphorus sulfide-Paratone-degras additive. This is demonstrated by the following.

Several portions of the additive of Example A were treated with the amounts of flake potassium hydroxide (15% water) listed in the following table. The ash contents of the additives were determined in each case.

In the table, the first two columns show the amount of potassium hydroxide, in weight percent and in equivalents, respectively, reacted with the additive of Example A. The third column represents the amount of potassium sulfate as ash which would be present if all the potassium hydroxide were being utilized in neutralizing the organic acids of the additive. The fourth column is the ash which is actually found in the treated additives. The corrected ash content due to neutralization is shown in the last column. Thus, the columns to be compared are A and B.

TABLE XIII

| Example No. | Amt. of KOH on Anhydrous Basis | | A Equivalent Amt. K$_2$SO$_4$ in Wt. Percent | Actual Ash by Sulfate method Content, Wt. Percent | B Corrected Ash Content, Wt. Percent |
|---|---|---|---|---|---|
| | Wt. Percent | Equivs. | | | |
| 18 | 0.5 | 0.41 | 0.77 | 1.20 | 0.70 |
| 19 | 0.9 | 0.74 | 1.4 | 1.75 | 1.25 |
| 20 | 1.0 | 0.83 | 1.55 | 1.88 | 1.38 |
| 21 | 1.21 | [1] 1.0 | 1.88 | 2.04 | 1.54 |
| 22 | 1.51 | 1.25 | 2.35 | 2.36 | 1.87 |
| 23 | 1.82 | 1.5 | 2.82 | 2.28 | 1.78 |
| 24 | 0.66 | 0.5 | 1.02 | [1] 1.65 | [2] 1.05 |
| 25 | 1.31 | [1] 1.0 | 2.04 | 2.50 | 1.95 |
| 26 | 2.62 | 2.0 | 4.08 | 2.75 | 2.15 |
| 27 | 2.93 | 3.0 | 6.12 | 2.77 | 3.15 |

[1] The weight percent KOH required for one equivalent differs in these two cases because the acidity of the unneutralized additives differed in the two batches. The neut. no. of the unneutralized additive in the first series was 15.1, in the second series was 22.2.

[2] An ash content of 0.6% for the unneutralized additive in this series was assumed, since the actual analysis was not available. This assumption is justified since the actual figures obtained in the last column are not important—it is the relation between them which is significant. This relation would not be changed by subtracting the same correction from each figure, even though the correction was slightly incorrect.

The above data show that in the range where the greatest improvement in the properties in the additives is obtained, i. e., in the range from 1.25 to 2 equivalents of potassium hydroxide, the ash content (Column B) of the additive is not increasing. This shows that the potassium hydroxide is not reacting with the additive itself. One possible explanation for this behavior is that the first reaction which occurs is the formation of oil-soluble soaps with the available acidic groups of the additive. This is a conventional neutralization and is measured by the increase in the ash content (Column B). After this neutralization has been completed, reaction occurs between the potassium hydroxide and other phosphorus and sulfur-containing acids which may be present, producing potassium phosphates and sulfates which are oil-insoluble. When the additive is settled or filtered they remain behind in the residue and accordingly are not detected as an increase in ash content. This accounts for the failure of the ash content to increase when between 1.25 and 2 equivalents of potassium hydroxide is reacted, as Examples 19 to 23 and 25 and 26 show. Any unneutralized acid, if present in the oil, would be expected to have a deleterious effect on performance. It would probably act as a catalyst for undesirable reactions and its removal in the residue following the neutralization with potassium hydroxide therefore accounts for the improvement noted after two equivalents of potassium hydroxide have been reacted.

A third reaction evidently occurs when more than three equivalents of potassium hydroxide is reacted, resulting in a new increase in ash content (Example 27). Example 27 is a high ash additive but no greater improvement is noted in its color, color stability, hydrogen sulfide stability and engine performance compared to Example 26.

The O. D. color is protected and the color stability of the additive is enhanced by the treatment of the invention, to such an extent that clay treatment is unnecessary, and in addition hydrogen sulfide stability is greatly improved. The neutralization number is lowered from 20 for the starting reaction product to values of two or less. Varnish formation is nearly eliminated. The demerit rating of the additive is improved, as measured by the L-4 Chevrolet Engine Test even though the sulfur content may be reduced. The sulfur content is lower and the ash content higher, but both are well within the permissible limits, and the treated additive is more soluble in the oil.

The properties of the additives are improved the most by the larger amounts of potassium hydroxide, two equivalents of potassium hydroxide being the optimum. This is demonstrated by the preceding examples.

The treated products of the invention are useful as lubricating oil additives. The amount of the final reaction product to be incorporated in an oil or grease will depend upon the characteristics of the oil or grease and the intended use. Some oils have more of a tendency to corrode metals or to form acids, sludge and lacquer deposits than others, and such oils require larger amounts of the additive. Also, oils that are intended for use at higher temperatures require larger amounts of the additive. In general the range is from about 0.5% to about 10% additive by weight of the oil. Under some circumstances amounts as low as about 0.01% show a significant improvement. Since the reaction product of the invention is itself a lubricant there is no upper limit in the amount that can be added to the oil. However, it may be uneconomical to include in the lubricant more of the reaction product of the invention than is necessary to impart the desired properties and from this standpoint, generally not over 50% of the additive of the invention would be used.

If desired, the additives of the invention may be used together with other oil addition agents, e. g., pour point depressants or film strength agents. In some instances it is desirable to include in the lubricating oil containing the additive an agent for improving the clarity of the oil, e. g., lecithin, lauryl alcohol and the like, which are well known to the art, and in order to prevent foaming of the oil it is desirable in some cases to add small amounts of tetraamyl silicate, an alkyl ortho carbonate, ortho formate or ortho acetate, of polyalkylsilicone oil.

All parts and percentages in the specification and claims are by weight, and weights of additive are based on the weight of the oil unless otherwise indicated.

I claim:

1. A process for improving the color, color stability and stability against liberation of hydrogen sulfide of phosphorus sulfide-oxygen-containing organic compound-olefin polymer reaction products, said oxygen-containing organic compound being selected from the group consisting of those compounds containing hydroxy, carbonyl, ether and carboxy radicals, and having a boiling point of at least 225° F. which comprises reacting the reaction product with an amount of solid potassium hydroxide in excess of the amount required just to neutralize the reaction product within the range from over 1.25 equivalent up to about three equivalents per mole of the reaction product at an elevated temperature at which the materials react for a time to complete the reaction and separating insoluble materials from the reaction mixture to obtain an improved reaction product.

2. A process in accordance with claim 1 in which the reaction is carried out at a temperature of at least 250° C.

3. A process in accordance with claim 1 in which the reaction is carried out with flake potassium hydroxide.

4. A process in accordance with claim 1 in which the reaction product is reacted with from 1.25 to about 2.5 equivalents of potassium hydroxide per mole of the reaction product.

5. As an oil-dispersible composition suitable for use as a lubricant additive the reaction product of a phosphorus sulfide-oxygen-containing organic compound-olefin polymer reaction product with solid potassium hydroxide produced by the process in accordance with claim 1 and characterized by improved color, color stability and stability against liberation of hydrogen sulfide.

6. A reaction product in accordance with claim 5 in which the oxygen-containing organic compound is an ester wax.

7. A reaction product in accordance with claim 5 in which the oxygen-containing organic compound is degras.

8. A reaction product in accordance with claim 5 in which the phosphorus sulfide is phosphorus pentasulfide.

9. A reaction product in accordance with claim 5 in which the olefin polymer is a polyisobutylene.

10. A lubricating composition comprising a major amount of a mineral lubricating oil and a minor amount sufficient to inhibit the oxidative deterioration of the oil in service of the reaction product of claim 5.

11. A lubricating composition comprising a major amount of a mineral lubricating oil and a minor amount sufficient to inhibit the oxidative deterioration of the oil in service of the reaction product of claim 6.

12. A lubricating composition comprising a major amount of mineral lubricating oil and a minor amount sufficient to inhibit the oxidative deterioration of the oil in service of the reaction product of claim 7.

13. A lubricating composition comprising a major amount of a mineral lubricating oil and a minor amount sufficient to inhibit the oxidative deterioration of the oil in service of the reaction product of claim 8.

14. A lubricating composition comprising a major amount of a mineral lubricating oil and a minor amount sufficient to inhibit the oxidative deterioration of the oil in service of the reaction product of claim 9.

15. As an oil dispersible composition suitable for use as a lubricant additive the reaction product of phosphorus pentasulfide-degras-polyisobutylene reaction product with solid potassium hydroxide, produced by the process in accordance with claim 1 and characterized by improved color, color stability and stability against liberation of hydrogen sulfide.

16. A lubricating composition comprising a major amount of a mineral lubricating oil and a minor amount sufficient to inhibit the oxidative deterioration of the oil in service of the reaction product of claim 15.

References Cited in the file of this patent
UNITED STATES PATENTS

| | | |
|---|---|---|
| 2,316,091 | White | Apr. 6, 1943 |
| 2,367,468 | Mixon et al. | Jan. 16, 1945 |
| 2,566,241 | Musselman | Aug. 28, 1951 |
| 2,637,722 | Frazier | May 5, 1953 |